United States Patent
Shmidt (10) Patent No.: US 10,579,033 B2
(45) Date of Patent: Mar. 3, 2020

(54) RECONSTRUCTING USER-LEVEL INFORMATION FROM INTERCEPTED COMMUNICATION-PROTOCOL PRIMITIVES

(71) Applicant: INDEGY LTD., Tel Aviv (IL)

(72) Inventor: Dan Shmidt, Tel Aviv (IL)

(73) Assignee: INDEGY LTD., Tel Aviv (IL)

(*) Notice: Subject to any disclaimer, the term of this patent is extended or adjusted under 35 U.S.C. 154(b) by 308 days.

(21) Appl. No.: 14/997,541

(22) Filed: Jan. 17, 2016

(65) Prior Publication Data

US 2017/0205796 A1 Jul. 20, 2017

(51) Int. Cl.
*G05B 19/05* (2006.01)
*G05B 19/042* (2006.01)

(52) U.S. Cl.
CPC ............. *G05B 19/0428* (2013.01); *G05B 2219/23275* (2013.01)

(58) Field of Classification Search
CPC .................................................. G05B 19/05
See application file for complete search history.

(56) References Cited

U.S. PATENT DOCUMENTS

| 7,711,440 | B1* | 5/2010 | Campbell | G05B 19/4183 700/19 |
| 9,081,578 | B1* | 7/2015 | Berg | G06F 16/9024 |
| 2016/0062954 | A1* | 3/2016 | Ruff | G06F 17/21 715/249 |
| 2016/0102878 | A1* | 4/2016 | Smith | F24F 11/30 700/276 |

OTHER PUBLICATIONS

Tsarfaty., "Introduction to Natural Language Processing", IDC Course / Class #5, 78 pages, Apr. 12, 2013.
Tsarfaty et al.,"NLP@IDC Lecture #6—Probabilistic Context-Free Grammars for Parsing", 107 pages, Apr. 23, 2013.
IEC 61131-5—International Standard,Programmable controllers—Part 5: Communications , First edition 102 pages, Nov. 2000.
Introduction to Programmable Logic Controllers (PLCs)—Industrial Control System, MME 486, 47 pages, 2006.

* cited by examiner

*Primary Examiner* — Matthew E. Gordon
(74) *Attorney, Agent, or Firm* — Kligler & Associates Patent Attorneys Ltd (57) ABSTRACT

A method includes holding multiple primitives of a communication protocol, which is used for managing a controller that controls one or more field devices in an industrial control network. Multiple scenarios are defined, each corresponding to one or more respective sequences of primitives exchanged with the controller over the industrial control network for achieving a respective user-level operation. Multiple parsing rules for deriving the sequences of primitives from the respective scenarios are further defined. A sequence of primitives that were exchanged with the controller over the industrial control network is intercepted. An attempt to reconstruct from the intercepted sequence of primitives, using the parsing rules, one or more scenarios that each corresponds to the intercepted sequence of primitives is carried out, and, in response to succeeding in reconstructing one or more scenarios, extracting user-level information from the reconstructed scenarios.

13 Claims, 3 Drawing Sheets

RECONSTRUCTING USER-LEVEL INFORMATION FROM INTERCEPTED COMMUNICATION-PROTOCOL PRIMITIVES

FIELD OF THE INVENTION

The present invention relates generally to network management, and particularly to methods and systems for reconstructing user-level information from intercepted communication-protocol primitives.

BACKGROUND OF THE INVENTION

Industrial Control Systems (ICSs) typically comprise Programmable Logic Controllers (PLCs) that control various field devices. PLCs are described, for example, in "Introduction to Programmable Logic Controllers (PLCs)—Industrial Control Systems," 2006, which is incorporated herein by reference. A PLC is typically managed by exchanging with the PLC control and management primitives over a communication network of the ICS. Various aspects of programmable controllers are specified, for example, by the International Electrotechnical Commission (IEC) in a family of specifications referred to as IEC 61131. More specifically, the specification titled "International standard IEC 61131-5, Programmable controllers—Part 5: Communications," first edition, November, 2000, whose disclosure is incorporated herein by reference, specifies communication aspects of a programmable controller.

SUMMARY OF THE INVENTION

An embodiment that is described herein provides a method that includes holding multiple primitives of a communication protocol, which is used for managing a controller that controls one or more field devices in an industrial control network. Multiple scenarios are defined, each corresponding to one or more respective sequences of primitives exchanged with the controller over the industrial control network for achieving a respective user-level operation. Multiple parsing rules for deriving the sequences of primitives from the respective scenarios are further defined. A sequence of primitives that were exchanged with the controller over the industrial control network is intercepted. An attempt to reconstruct from the intercepted sequence of primitives, using the parsing rules, one or more scenarios that each corresponds to the intercepted sequence of primitives is carried out, and, in response to succeeding in reconstructing one or more scenarios, extracting user-level information from the reconstructed scenarios.

In some embodiments, the method includes defining multiple tasks that each corresponds to a sub-sequence of at least one sequence of primitives to which one or more of the scenarios correspond, and defining the parsing rules includes defining a parsing rule that replaces a given scenario with at least a task. In other embodiments, defining the parsing rules includes defining a rule that replaces a given task with one or more tasks, with one or more primitives, or with a combination of at least a task and a primitive. In yet other embodiments, defining the parsing rules includes assigning to the parsing rules respective probability values, and a probability of a scenario or a task corresponding to a given sequence of primitives depends on the probabilities assigned to the parsing rules used for deriving the given sequence of primitives from the scenario or task, respectively.

In an embodiment, attempting to reconstruct a scenario includes selecting a task having a highest probability among the tasks that each derives, using the parsing rules, a sub-sequence of the intercepted sequence. In another embodiment, extracting the user-level information includes selecting a scenario having a highest probability among at least some of the scenarios corresponding to the intercepted sequence of primitives. In yet another embodiment, intercepting the sequence of primitives includes reordering the intercepted primitives to match an order of the primitives in a sequence of primitives that has at least one corresponding scenario.

In some embodiments, intercepting the sequence of primitives includes intercepting a partial sub-sequence of a sequence of primitives that has a corresponding given scenario, and attempting to reconstruct the given scenario includes attempting reconstruction using the partial sub-sequence. In other embodiments, intercepting the sequence of primitives includes intercepting a given sequence in which one or more of the primitives include nuisance primitives unrelated to the user-level operation, the given sequence excluding the nuisance primitives has a corresponding given scenario, and defining the parsing rules includes defining one or more rules for handling the nuisance primitives and that are used in deriving the given sequence from the given scenario, and attempting to reconstruct the given scenario includes attempting reconstruction of the given scenario from the given sequence using at least a rule defined for handling the nuisance primitives. In yet other embodiments, one or more of the primitives in the intercepted sequence carries payload information, and extracting the user-level information includes aggregating the payload information from some or all of the primitives in the sequence.

There is additionally provided, in accordance with an embodiment that is described herein, an apparatus that includes an interface and a processor. The interface is configured to communicate over an industrial control network. The processor is configured to hold multiple primitives of a communication protocol, which is used for managing a controller that controls one or more field devices in the industrial control network, to define multiple scenarios that each corresponds to one or more respective sequences of primitives exchanged with the controller over the industrial control network for achieving a respective user-level operation, to further define multiple parsing rules for deriving the sequences of primitives from the respective scenarios, to intercept via the interface a sequence of primitives that were exchanged with the controller over the industrial control network, to attempt to reconstruct from the intercepted sequence of primitives, using the parsing rules, one or more scenarios that each corresponds to the intercepted sequence of primitives, and, in response to succeeding in reconstructing one or more scenarios, to extract user-level information from the reconstructed scenarios.

The present invention will be more fully understood from the following detailed description of the embodiments thereof, taken together with the drawings in which:

DETAILED DESCRIPTION OF EMBODIMENTS

Overview

In various industrial control systems, field devices that carry out some industrial process are controlled by controllers such as Programmable Logic Controllers (PLCs). A PLC typically runs an application program for controlling one or more field devices to which the PLC locally connects. The PLC additionally holds configuration parameters in accordance with the desired control process.

PLCs are typically managed by remote nodes, such as by an engineering station, over a communication network. For example, a remote node may download an application program and/or configuration parameters to the controller upon initialization or when an updated program version or configuration should be installed. As another example, a remote node may retrieve information from the controller for monitoring, verification and security purposes. An operation that a remote node applies to a controller is referred to herein as a user-level operation.

A user-level operation typically comprises a hierarchy of sub-operations, in which the user-level operation is referred to herein as a "scenario," sub-operations that further break to other sub-operations are referred to herein as "tasks," and sub-operations at the bottom of the hierarchy are referred to herein as "primitives" or "jobs." The primitives or jobs may comprise, for example, the basic communication-protocol primitives required for managing the PLC operation during its lifecycle. Example such primitives include commands such as 'stop' and 'start.'

In some implementations, it is desirable to monitor and track the user-level operations ("scenarios") applied to the controllers over the communication network. Monitoring and tracking of scenarios is useful, for example, for various network management, network visibility and security applications.

In terms of network traffic, the primitives comprise request-response transactions that can be intercepted and identified. The tasks and scenarios, however, are abstract entities that cannot be directly identified from the network traffic.

Embodiments that are described herein provide methods and systems for reconstructing user-level information from network intercepted primitives. The user-level information relates to the user-level operation, and to sub-operations that are meaningful to the user.

In practice, a scenario associated with a user-level operation of a given type may correspond to one or more different sequences of primitives. For example, an operation that downloads data blocks to a controller corresponds to multiple different sequences of primitives, depending on the number of blocks delivered. In addition, a given sequence of primitives may have one or more corresponding scenarios, for example, when the sequence contains nuisance primitives that are not directly related to the underlying user-level operation.

In the disclosed embodiments, an appliance that connects to the industrial control network monitors the network traffic that is exchanged with a controller. The appliance defines multiple scenarios that each corresponds to one or more respective sequences of primitives exchanged with the controller over the industrial control network for achieving a respective user-level operation. The appliance further defines multiple parsing rules for deriving the sequences of primitives from the respective scenarios. The parsing rules govern the procedures by which scenarios and tasks evolve within a hierarchy to derive the sequence of primitives.

In an embodiment, the appliance intercepts a sequence of primitives that were exchanged with the controller, and attempts to reconstruct from the intercepted sequence, using the parsing rules, one or more scenarios that each corresponds to the intercepted sequence of primitives. In response to succeeding in reconstructing one or more scenarios, the appliance extracts user-level information from the reconstructed scenarios.

In some embodiments, the parsing rules comprise a left-hand-side part (referred to herein as "left part" for brevity) and one or more right-hand-side parts (referred to herein as "right parts" for brevity), wherein applying a parsing rule results in replacing the left part of the rule with the right parts of the rule. In some embodiments, the left part of the rules comprises a scenario or task, and the right parts of the rules comprise one or more tasks, one or more jobs or a combination of at least a task and a job.

In some embodiments, each of the parsing rules is assigned a respective score or probability value. The rules probability values can be used for calculating a probability value to a scenario or task based on the probability values assigned to the parsing rules used for deriving the respective sequence of primitives from the scenario or task. In reconstructing a given scenario, the underlying tasks are reconstructed so that a selected task for a given sub-sequence of the sequence of primitives has the highest probability value among the tasks from which the sub-sequence can be derived.

Following reconstruction, the appliance may extract user-level information in various ways. In some embodiments, the appliance selects a scenario having the highest probability among all or some of the reconstructed scenarios. In other embodiments, the appliance outputs multiple reconstructed scenarios ranked by respective probability values. The appliance may also output information regarding the reconstructed tasks. In an example embodiment, the primitives in the intercepted sequence carry payload information. In this embodiment, the appliance aggregates the payload information from some or all of the primitives in the sequence. The aggregated information can be used, for example, for data integrity verification.

In some embodiments, for example when the network suffers packets loss, the appliance may fail to intercept all the primitives exchanged during a given operation, in which case the sequence used for reconstruction is a partial sub-sequence of the actual sequence of primitives of the operation. In such embodiments, a scenario can still be reconstructed from the partial sub-sequence using the parsing rules and respective probability values.

In some embodiments, the primitives exchanged in applying a given user-level operation are intercepted in an order that is different from the expected order as in the respective sequence of primitives. In such embodiments, the intercepted primitives are reordered to match the primitives order in a sequence of primitives that has at least one corresponding scenario.

In some embodiments, the intercepted sequence comprises one or more nuisance primitives that are unrelated to the underlying user-level operation. In such embodiments, the appliance further defines one or more parsing rules for handling the nuisance primitives so that the scenario corresponding to the intercepted sequence excluding the nuisance primitives can be reconstructed from the sequence that contains the nuisance primitives.

System Description

Figure 1:
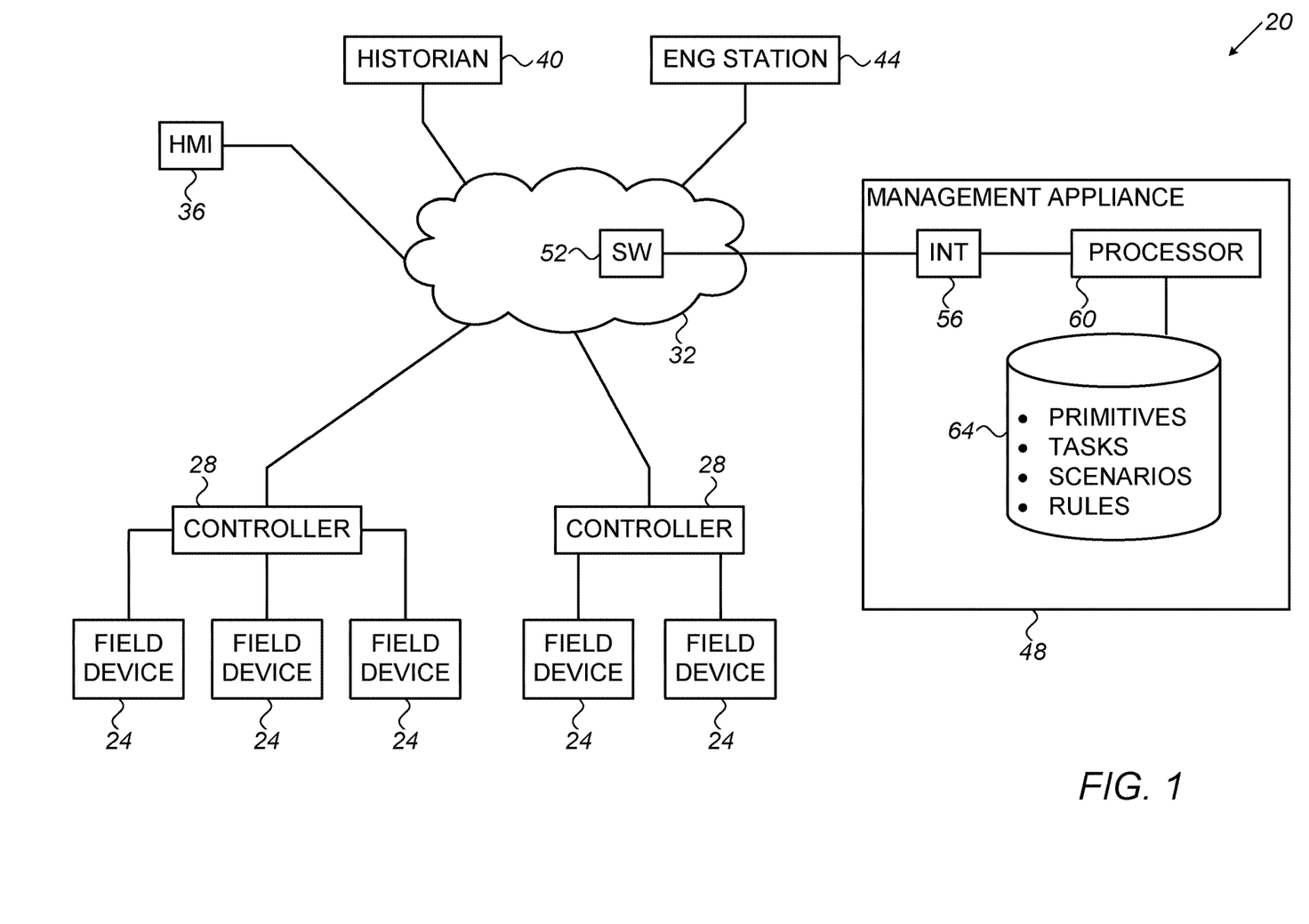
FIG. 1 is a block diagram that schematically illustrates a an industrial control network, in accordance with an embodiment that is described herein.

FIG. 1 is a block diagram that schematically illustrates an industrial control network 20, in accordance with an embodiment that is described herein. Network 20 typically controls field devices 24 that carry out a desired industrial process in some industrial environment, e.g., a factory production line, a power plant, a chemical plant or any other suitable environment.

In the example of FIG. 1, network 20 comprises one or more field devices 24 that are controlled by one or more controllers 28. Field devices 24 typically comprise electromechanical devices that perform actions such as, for example, opening and closing valves, controlling electrical relays and circuit breakers, collecting data from environmental sensors, monitoring alarm conditions and other events, or any other suitable action.

Controllers 28 may comprise, for example, Programmable Logic Controllers (PLCs). Each controller 28 typically controls one or more of field devices 24. A controller typically communicates with a field device using a suitable (e.g., serial) interface so as to instruct the field device to perform various actions and/or to collect data and measurements from the field device.

Controllers 28 are typically connected by a Local Area Network (LAN) 32. LAN 32 may be wired and/or wireless, and may operate in accordance with any suitable communication protocol, e.g., Ethernet or TCP. Additional network nodes that may be connected to LAN 32 comprise, for example, a Human-Machine Interface (HMI) station 36, a historian 40 and an engineering station 44.

HMI station 36 is used by an operator for monitoring and controlling the industrial process via controllers 28. Historian 40 is used for collecting and logging relevant data relating to the process for later analysis. Engineering station 44 is used by technical staff for controlling and configuring network 20, and particularly controllers 28.

An operation applied to a controller 28 by a network node such as HMI station 36, historian 40, engineering station 44 or appliance 48 (described below), is referred to herein as a user-level operation. A user-level operation typically breaks into a sequence of request-response transactions over LAN 32. In some embodiments, such transactions conform to control and management primitives defined in the IEC 61131 specifications cited above.

In the disclosed embodiments, network 20 further comprises a management appliance 48. Among other tasks, appliance 48 monitors the LAN 32 traffic, in an attempt to reconstruct from primitives intercepted in the network traffic user-level information related to a user-level operation applied to a controller 28. The functionality of appliance 48 is described in detail further below.

In the example of FIG. 1, management appliance 48 comprises a network interface 56 for connecting to LAN 32. In the present example, although not necessarily, appliance 48 is connected to a network switch 52 or other network element in LAN 32. Appliance 48 further comprises a processor 60 that is configured to carry out the methods described herein, and a database 64 that is configured to store information that processor 60 requires for reconstructing the user-level information from intercepted sequences of primitives. In some embodiments, database 64 additionally stores one or more baseline versions of the controller firmware, application logic and/or configuration parameters (not shown). Processor 60 uses these baseline versions for detecting possible mis-configurations of controllers 28 and/or hostile attacks on the controllers.

The configurations of network 20 and management appliance 48 shown in FIG. 1 are example configurations, which are chosen purely for the sake of conceptual clarity. In alternative embodiments, any other suitable configurations can be used for network 20 and/or appliance 48. For example, management appliance 48 may be implemented on a standalone server or other platform, as software running on an existing platform such as engineering station 44, or in any other suitable way. Typically, however, appliance 48 is implemented as a separate trusted platform that is independent of other network elements and is therefore less susceptible to attack. In an embodiment, appliance 48 may be implemented as a virtual appliance that runs on a hypervisor in network 20.

The different elements of appliance 48 may be implemented using suitable software, using hardware, e.g., using one or more Application-Specific Integrated Circuits (ASICs) or Field-Programmable Gate Arrays (FPGAs), or using a combination of software and hardware elements. Database 64 may be implemented using any suitable memory, such as a solid-state or magnetic storage device.

Typically, processor 60 comprises a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

A controller 28, e.g., PLC, is typically configured with firmware code that implements the basic controller functions and operating system. When deployed to perform a particular process in network 20, each controller 28 is configured with suitable application logic and configuration parameters to perform the desired process. In the context of the present patent application, the controller firmware, application logic and configuration parameters are referred to collectively as "code" or "controller code."

The application logic typically specifies sequences of device-level operations, rules and conditions, and/or other logic for operating field devices 24. The configuration parameters typically specify numerical values for the application logic, e.g., temperature thresholds and time durations.

During its lifecycle, a controller is typically subject to various user-level operations. For example, in some embodiments, it is possible to modify and reconfigure the firmware, logic and/or parameters of a given controller 28 by downloading an updated code version or configuration parameters to the controller over LAN 32. As another example, the currently installed code version and/or configuration parameters can be retrieved over LAN 32, e.g., for security purposes such as integrity verification, or for detecting mis-configuration.

Representing User-Level Operations Using Parsing Trees

Applying a user-level operation to a controller 28 typically involves exchanging with the controller one or more primitives from which the operation is built. A user-level operation of a given type may correspond to a single sequence of primitives or to multiple different sequences of primitives. For example, a download operation may correspond to different sequences of primitives, depending on the number of blocks downloaded.

Note that a given sequence of primitives may correspond to more than a single user-level operation. Such ambiguous correspondence may occur when nuisance primitives that are not integral part of the user-level operation are exchanged with the controller within the time duration of the user-level operation. In such a case, in addition to the primitives related to the operation, the sequence of primitives to which the operation corresponds may contain one or more nuisance primitives that are not related to the operation.

In some embodiments, management appliance 48 monitors LAN 32 to intercept primitives that are exchanged with controllers 28. Based on an intercepted sequence of primitives, and using certain parsing rules according to which user-level operations are associated with sequences of primitives, appliance 48 reconstructs the user-level operation. In some embodiments the parsing rules are predefined. In other embodiments, at least some of the parsing rules are learned by applying selected user-level operations and analyzing the resulting transactions over the network. The process of deriving a sequence of primitives from a respective scenario (or task) using suitable parsing rules, can be depicted graphically using a structure that is referred to as a "parsing tree."

Figure 2:
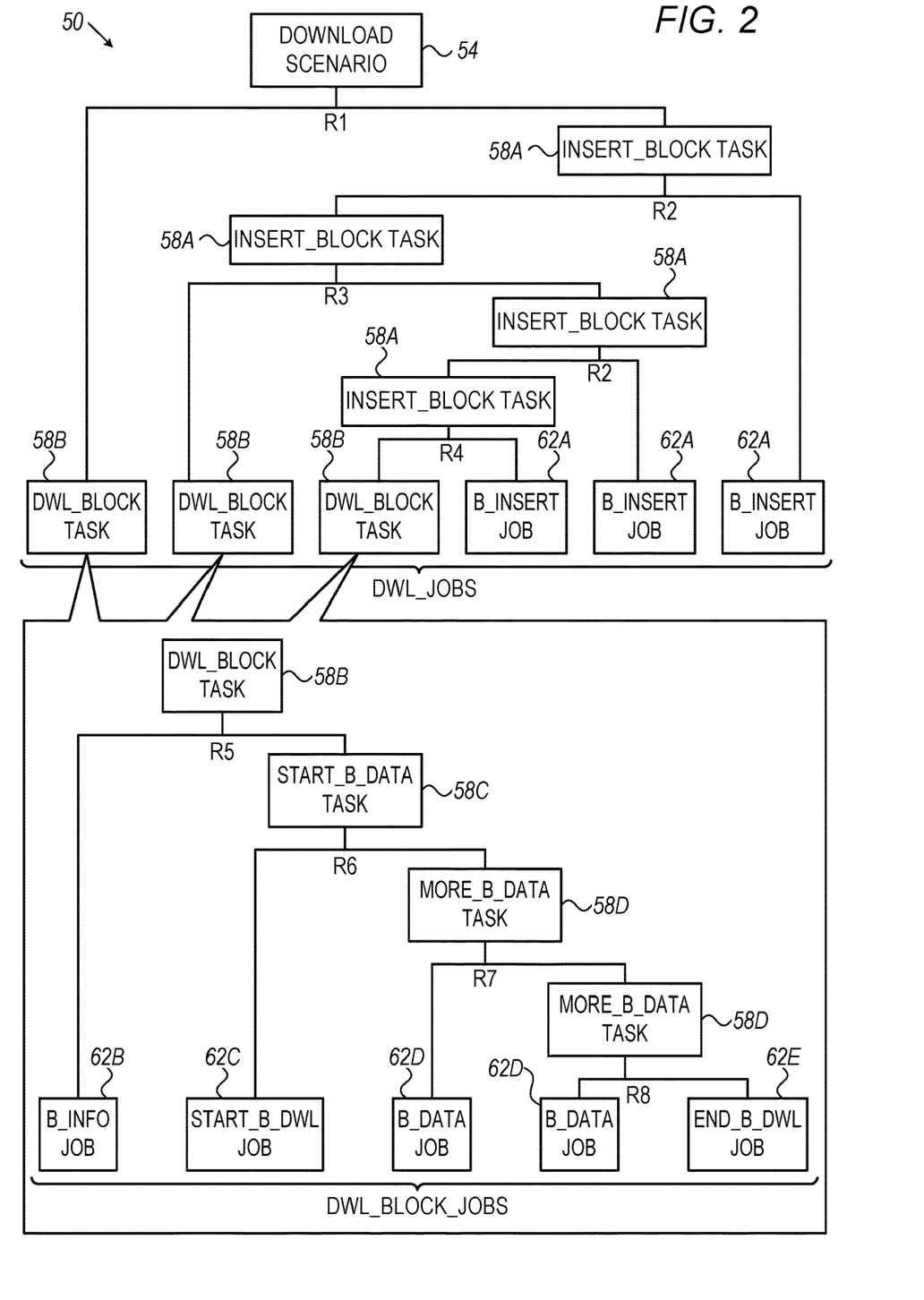
FIG. 2 is a diagram showing a parsing tree that parses a scenario associated with a download operation, in accordance with an embodiment that is described herein.

FIG. 2 is a diagram showing a parsing tree 50 that parses a scenario associated with a download operation, in accordance with an embodiment that is described herein. The download operation can be applied, for example, for updating the code currently installed in controller 28.

A user-level operation (or scenario) comprises one or more sub-operations. Some sub-operations are further built from other sub-operations. In the present example, the download operation comprises a sequence of six main sub-operations, i.e., three DOWNLOAD_BLOCK sub-operations and three BLOCK_INSERT sub-operations. Each DOWNLOAD_BLOCK sub-operation serves for sending two data blocks to the controller. In the present example, the DOWNLOAD_BLOCK sub-operation corresponds to a sequence of five jobs.

In the example of FIG. 2, the top part of parsing tree 50 comprises tasks 58A and 58B denoted INSERT_BLOCK_TASK and DWL_BLOCK_TASK, respectively, as well as jobs 62A denoted B_INSERT_JOB. The parsing of task 58A is detailed at the lower part of FIG. 2, and comprises tasks 58C and 58D, denoted START_B_DATA and MORE_B_DATA, respectively.

Task DWL_BLOCK_TASK corresponds to a sub-sequence DWL_BLOCK_JOBS that comprises jobs 62B . . . 62E denoted B_INFO_JOB, START_B_DWL_JOB, B_DATA_JOB and END_B_DWL_JOB, respectively. Similarly, each of tasks START_B_DATA and MORE_B_DATA corresponds to a respective sub-sequence of DWL_BLOCK_JOBS.

DOWNLOAD_SCENARIO 54 corresponds to a job-sequence denoted DWL_JOBS, which comprises three job-sequences DWL_BLOCK_JOBS, followed by a sequence of three jobs of type B_INSERT_JOB. Scenario 54 thus corresponds to job-sequence DWL_JOBS, and each of tasks 58A . . . 58D corresponds to a respective sub-sequence of DWL_JOBS.

Deriving a sequence of primitives from a scenario or task involves applying a sequence of parsing rules starting at the scenario or task, respectively. A parsing rule is defined by a left part and one or more right parts. Applying a parsing rule results in replacing the left part of the rule with the right parts of the rule. In the context of the present disclosure, the left part of a rule comprises a scenario or task, and the right parts of the rule comprise one or more scenarios, one or more tasks, one or more jobs or a combination comprising at least one task and at least one job. In some embodiments, parsing tree 50 additionally comprises a starting scenario (not shown) from which download scenario 54 and possibly other scenarios of other user-level operations are derived.

Each of the parsing rules used in parsing tree 50 has one of the forms S→(A,B), A→(C,D) or A→E, wherein S denotes a scenario, A and B denote tasks, each of C and D denotes a task or a job, and E denotes a job. Note that a parsing rule may be applied multiple times within a given parsing tree. For example, the parsing rule denoted R2 in FIG. 2 is applied twice in parsing tree 50. Table 1 summarizes the parsing rules governing parsing tree 50.

TABLE 1

Parsing rules used in parsing tree 50

| RULE # | Rule Left side part | Left TASK/JOB | Right TASK/JOB | Prob |
|---|---|---|---|---|
| R1 | DWL_SCENARIO | DWL_BLOCK TASK | INSERT_BLOCK TASK | 1.0 |
| R2 | INSERT_BLOCK TASK | INSERT_BLOCK TASK | B_INSERT JOB | 0.8 |
| R3 | INSERT_BLOCK TASK | DWL_BLOCK TASK | INSERT_BLOCK TASK | 0.15 |
| R4 | INSERT_BLOCK TASK | DWL_BLOCK TASK | B_INSERT JOB | 0.15 |
| R5 | DWL_BLOCK TASK | B_INFO JOB | START_B_DATA TASK | 1.0 |
| R6 | START_B_DATA TASK | START_B_DWL JOB | MORE_B_DATA TASK | 1.0 |
| R7 | MORE_B_DATA TASK | B_DATA JOB | MORE_B_DATA TASK | 0.7 |
| R8 | MORE_B_DATA TASK | B_DATA JOB | END_B_DWL JOB | 0.3 |

Parsing tree 50 comprises a root 54 denoted DWONLOAD_SCENARIO, multiple tasks 58 represented as vertices in the tree structure, and jobs 62 represented as the tree leaves.

The parsing rules in Table 1 can be used for parsing download scenarios other than scenario 54. Such download scenarios may correspond to job-sequences comprising a number of DWL_BLOCK_JOBS sequences other then three, followed by the same number of B_INSERT jobs, wherein each DWL_BLOCK_JOBS sequence may comprise a number of B_DATA jobs other than two.

In the disclosed embodiments, the parsing rules are assigned respective score values. The score values can be assigned in any suitable contiguous or noncontiguous range of numbers. In the description that follows we mainly refer to score values that are assigned in the range [0-1] and can be interpreted as probability values.

In some embodiments, the probability values assigned to the rules are used for evaluating the probability of the entire parsing tree or equivalently to the scenario of the tree. The rule probability values can additionally be used for assigning respective probability values to individual tasks. Assuming that a given parsing tree contains the rules A1→B1, A2→B2, . . . , An→Bn, and that the rule probability values are respectively denoted p(Ri)=p(Ai→Bi), then the probability p(t) of the entire tree is given by:

$$p(t) = \prod_{i=1}^{n} p(Ai \to Bi) \qquad \text{Equation 1}$$

For example, the probability assigned to parsing tree 50 is evaluated as $p(R1) \cdot [p(R2)]^2 \cdot [p(R3) \cdot p(R4) \cdot [p(R5) \cdot p(R6) \cdot p(R7) \cdot p(R8)]^3$. A calculation similar to the calculation in Equation 1 can be applied for evaluating the probability values of the tree tasks. For example, the probability of task 58C in FIG. 2 is given by $p(R6) \cdot p(R7) \cdot p(R8)$.

In some embodiments, the probability assigned to a tree is used for resolving parsing ambiguity. Thus, when two or more different trees (or scenarios) derive a common sequence of primitives, the trees are ranked by their respective probability values. In an embodiment, the tree having the highest probability may be selected as being more likely to match the common sequence of primitives than the other trees.

The parsing tree in FIG. 2 is given by way of example, and in alternative embodiments, other suitable parsing trees can also be used. For example, parsing trees corresponding to a user-level operation other than download may be governed by parsing rules other than the example rules in Table 1.

Figure 3:
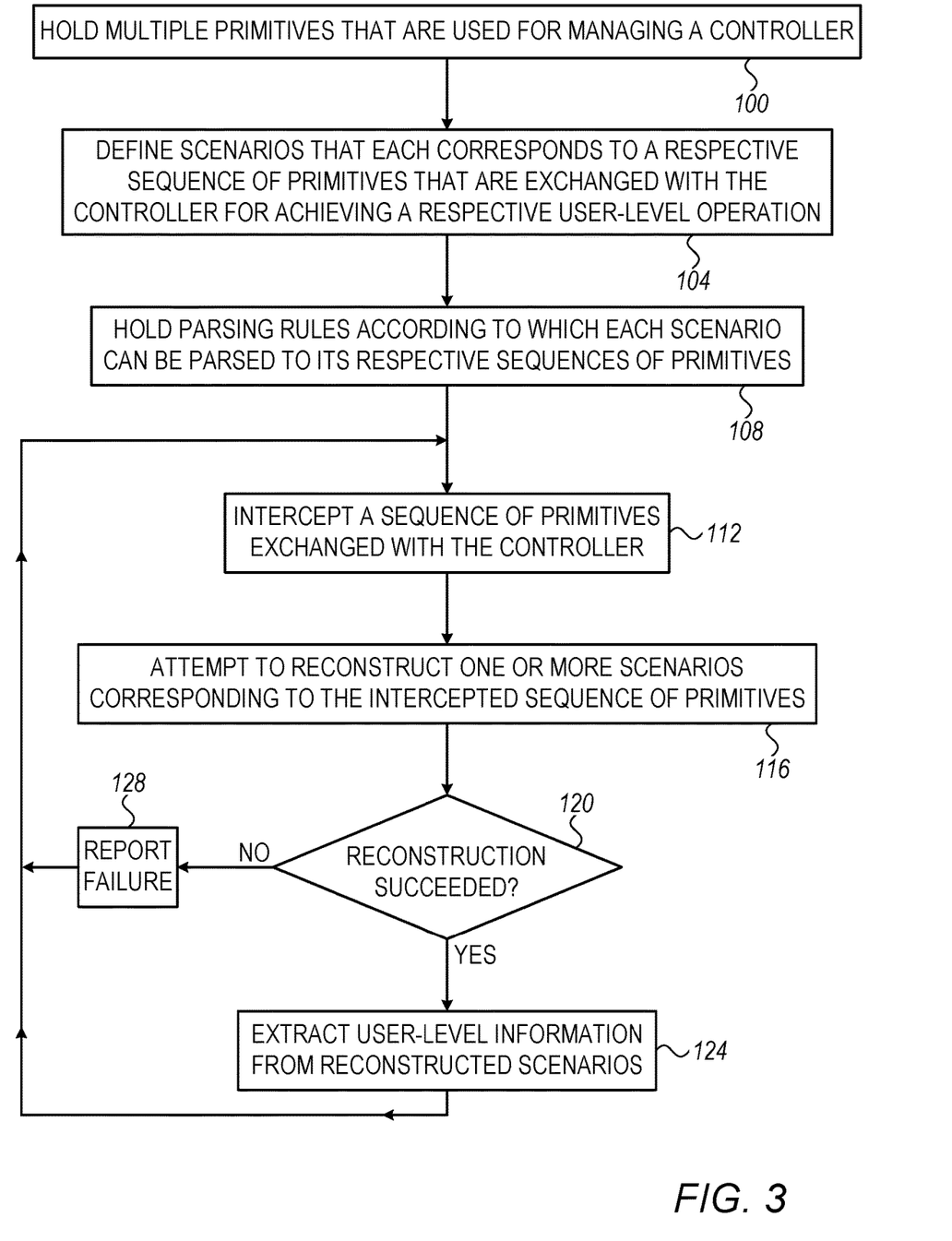
FIG. 3 is a flow chart that schematically illustrates a method for reconstructing user-level information from an intercepted sequence of primitives, in accordance with an embodiment that is described herein.

Reconstructing User-Level Information from Intercepted Primitives Using Parsing-Trees FIG. 3 is a flow chart that schematically illustrates a method for reconstructing user-level information from intercepted primitives, in accordance with an embodiment that is described herein. The method is described as being executed by processor 60 of appliance 48 of FIG. 1.

The method begins with processor 60 storing multiple primitives in database 64, at a primitives-storing step 100. The primitives comprise building blocks from which user-level operations for managing controller 64 are built. In an example embodiment, the stored primitives conform to the IEC 61131 specifications cited above. Alternatively or additionally, other suitable primitives for managing controller 28 can also be used.

At a scenario definition step 104, the processor defines multiple scenarios that are each associated with a respective user-level operation supported by controller 28. Each of the defined scenarios corresponds to one or more respective sequences of primitives that are exchanged with the controller for achieving the respective user-level operation. In an embodiment, the processor stores the defined scenarios in database 64.

At a rule holding step 108, the processor defines multiple parsing rules that are used for parsing each scenario defined at step 104 to its respective sequence (or multiple sequences) of primitives. As described above with reference to FIG. 2, the parsing rules can be defined in terms of scenarios, tasks and jobs. Example parsing rules that can be used in parsing tree 50 of FIG. 2 are described in Table 1 above.

At an interception step 112, the processor intercepts, via interface 56, a sequence of primitives that are exchanged with one of controllers 28 over LAN 32. In an embodiment, the communication over LAN 32 is carried out in accordance with the TCP protocol, and each primitive is intercepted by identifying a respective request-response transaction in the network traffic. In other embodiments, any other suitable communication protocol and interception method can also be used.

In some embodiments, the primitives are delivered as packets over LAN 32, and the processor intercepts the primitives per individual controller 28 based on packet destination information in one or more header fields of the packets.

In some situations, the primitives corresponding to a given user-level operations are intercepted in wrong order, for example, due to packet delivery via different routes in LAN 32. In an embodiment, the primitives in the intercepted sequence are reordered to match an order of the primitives in a sequence of primitives that has at least one corresponding scenario.

In some embodiments, LAN 32 may suffer packet loss events in which packets fail to reach their destination, for example, due to network congestion or any other reason. A packet loss event may result in a missing primitive within the intercepted sequence of primitives. In some embodiments, lost packets are recovered by network protocols such as TCP retransmissions. In other embodiments, a given scenario may be reconstructed even if there is a missing primitive in the sequence, by using the parsing rules and respective probability values.

At a reconstruction step 116, the processor attempts to reconstruct from the sequence of primitives intercepted at step 112, one or more scenarios that were defined at step 104. The reconstruction process uses the parsing rules defined at step 108. In some embodiments, each of the reconstructed scenarios is assigned a respective score or probability value, as described above. An example reconstruction method is described in detail below.

At a reconstruction check step 120 the processor checks whether or not the reconstruction at step 116 has succeeded. When the reconstruction process produces one or more scenarios that each corresponds to the intercepted sequence of primitives, the reconstruction is considered successful, and the processor proceeds to an information extraction step 124. Otherwise, none of the scenarios defined at step 104 derives the intercepted sequence of primitives using the parsing rules of step 108, and the processor proceeds to a failure reporting step 128, in which the processor reports that no scenario has been found. Alternatively, at step 120 the processor finds that the reconstructed scenarios have respective probability values below a predefined probability threshold, and at step 128 the processor reports this type of failure, accordingly.

At step 124, the processor may take various actions, depending on the desired type of information. For example, the processor may output the reconstructed scenarios, possibly ranked according to their probability values. Alternatively or additionally, the processor outputs the scenario having the highest probability.

In some embodiments, at least some of the primitives in the intercepted sequence carry information such as payload information. In such embodiments, the payload information of one or more of the primitives in the sequence is aggregated to generate output information. In some embodiments, the processor aggregates the payload information from the entire sequence of primitives of the intercepted sequence. In other embodiments, the processor identifies a given task in the reconstructed scenario, and aggregates the payload information from the primitives corresponding to the given task. In an embodiment, the aggregated payload information comprises a code version or configuration parameters retrieved from a controller, and the processor uses the aggregated payload information to verify the integrity of the code version or mis-configured parameters.

Following step 124 or 128 the method loops back to step 112 to intercept sub-sequent sequences of primitives.

As described above, an intercepted sequence of primitives may contain one or more nuisance primitives that are unrelated to the respective user level operation. To resolve the ambiguity between the user level operation and such sequences, additional parsing rules can be added as follows.

Job_task→JOB|Nuisance_task, JOB
Nuisance_task→Nuisance_job|Nuisance_task,
   Nusiance_ job According to these rules, a job task is replaced with a single job, or with a combination of a nuisance task and a job. Additionally, a nuisance_task is replaced by a nuisance job or by a combination of a nuisance task and a nuisance job. Note that using these rules, a TASK is not replaces directly with a JOB. Rather, the task is first replaces with a Job_task, and the Job_task is replaces with a JOB or with a Nusiance_task+JOB.

Example Reconstruction Method

In this paragraph we describe a method for reconstructing a scenario that best matches a given sequence of intercepted primitives. The method is described in a pseudo code form. The method can be used, for example, for implementing step 116 of the method described in FIG. 3 above. In describing the method we assume that processor 60 initially holds the following information, e.g., in database 64.

In describing the method below we assume rules of the form k→k1,k2 and k→k3, wherein each of k, k1 and k2 is a scenario or task and k3 is a job. It can be shown that rule sets of other forms can be translated to these two forms, and therefore the method described is generally applicable to other rule formulations as well.

Predefined information for reconstruction:
  JOBS—a set comprising all supported jobs.
  ST—a set comprising all supported scenarios and tasks, including a starting scenario S, from which all other scenarios and tasks can be derived. Each of the scenarios and tasks in ST corresponds to respective one or more sequences of jobs in the set JOBS.
  RULES—a set comprising parsing rules that can be used for parsing each scenario and task in ST to a respective sequence of jobs.
  PROBS—a set of probabilities that are respectively assigned to the parsing rules in the set RULES.

The input to the reconstruction method is a job-sequence comprising n jobs, J=J0 . . . J(n−1). The jobs may refer to primitives that are exchanged with controller 28 over LAN 32 and intercepted by the processor via interface 56.

The reconstruction method uses two main structures denoted RECON and PROB, each of which comprises a three-dimensional table of dimensions [n+1,n+1,K], wherein n is the length of the input job-sequence J, and K is the size of the set ST.

The elements stored in RECON comprise parsing rules. RECON[i,l,k], denotes an element in table RECON that stores the parsing rule in RULES, which has the highest probability among all the parsing rules in RULES whose left part k is the $k^{th}$ element (i.e., a scenario or task) in ST, wherein k can be parsed to the sub-sequence Ji . . . Jl of J. Note that the symbol "k" denotes both an element in ST and the respective index in RECON and PROBS.

More specifically, for i<l, RECON[i,l,k] stores a rule k→k1,k2, in which k1 can be parsed to the sub-sequence Ji . . . J(s−1) and k2 can be pared to the sub-sequence Js . . . J(l−1), and wherein i<s<l serves as a splitting point within the sub-sequence Ji . . . Jl. For i=l, RECON[i,i+1,k] stores a rule of the form k→Ji.

The element PROB[i,l,k] assigns a probability value to a task or a sub-tree whose root is k. For a rule of the form k→k1,k2, PROB[i,l,k] is determined by multiplying the probability of the rule k→k1,k2 by the probabilities of the sub-trees whose roots are k1 and k2, and wherein k1 and k2 correspond to the left and right sub-sequences Ji . . . J(s−1) and Js . . . J(l−1), respectively.

The reconstruction method mainly comprises an initialization phase and a loop phase, as will be described herein.
Initialization phase:
For 1≤i≤n, and for every k∈ST $$PROB[i-1, i, k] = \begin{cases} P[k \to Ji] & \text{if } [k \to Ji] \in RULES \\ 0 & \text{otherwise} \end{cases} \quad \text{Equation 2}$$

loop phase:
For len=2 . . . (n−1)
  For i=0 . . . (n−len)
    l=i+len
    For all scenarios and tasks k∈ST $$RECON[i, l, k] = \arg \max_{\substack{k \to k1,k2 \\ s \in [i+1,l-1]}} (P1 \cdot P2 \cdot P3) \quad \text{Equation 3}$$

$$PROB[i, l, k] = \max_{\substack{k \to k1,k2 \\ s \in [i+1,l-1]}} (P1 \cdot P2 \cdot P3) \quad \text{Equation 4}$$

Wherein P1, P2 and P3 in Equations 3 and 4 are given by:

$$P1 = P(k \to k1,k2)$$

$$P2 = PROB[i,s,k1]$$

$$P3 = PROB[s,l,k2] \quad \text{Equation 5:}$$

Following the loop phase, various outputs can be derived. Example outputs include:
  Recognition status: when the condition PROB[0,n,S]>0 is true, at least one scenario in ST matches the input job-sequence.
  Calculating a matching score: the value PROB[0,n,S] indicates the score assigned to the matching scenarios.

Traversing the parsing tree: start parsing S using the rule RECON[0,n,S] and recursively apply the parsing rules of the respective sub-trees down to the jobs. Extract information related to traversed tasks, as required.

Payload aggregation: aggregate payload data of the extracted jobs, as described above.

Note that using the parsing rules and probabilities values, a given sequence of primitives can always be processed using the reconstruction example method to produce some tree and corresponding probability for the tree. As a result scenario reconstruction is possible even when the sequence has one or more missing primitives.

Estimating Rule Probability Values

In some embodiments, the probability values assigned to the parsing rules are evaluated empirically, prior to being used for reconstruction. In an embodiment, each of the user-level operations is parsed to a respective parsing tree, using the parsing rules, to derive one or more respective sequences of primitives per each operation type. Parsing the operations is carried out over all or some of the operation types supported. The processor then traverses the parsing trees and counts for each rule A→B,C, the number of occurrences N(A→B,C.) The rule probability is estimated as the ratio between N(A→B,C) and the total number of rules in which the left part equals A.

The methods for scenario reconstruction described above are given by way of example, and in alternative embodiments are suitable methods can also be used.

Although the embodiments described herein mainly address communication protocols for managing the lifecycle of PLCs, the methods and systems described herein can also be used in other applications, such as in systems that employ other suitable communication protocols.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:

defining multiple parsing rules, describing for each scenario of multiple scenarios, a hierarchy of sub-operations forming the scenario from primitive request-response transactions, each parsing rule comprising a left-hand-side part and one or more right-hand-side parts, and a corresponding score value;

intercepting a sequence of the primitive request-response transactions that were exchanged over an industrial control network between a remote node and a controller in response to an actual user-level operation that was performed in the controller by the remote node;

reconstructing from the intercepted sequence of primitive request-response transactions, using the multiple parsing rules, one or more scenarios;

calculating for each of the reconstructed one or more scenarios, a match probability as a function of the corresponding score values of the multiple parsing rules used in the reconstruction of the reconstructed one or more scenarios; and outputting at least one of the reconstructed one or more scenarios as a reconstruction of the actual user-level operation that generated the intercepted sequence.

2. The method according to claim 1, and comprising selecting a user-level operation corresponding to one of the reconstructed one or more scenarios having a highest match probability, and wherein outputting the at least one of the reconstructed one or more scenarios comprises outputting the selected user-level operation.

3. The method according to claim 1, wherein intercepting the sequence of the primitive request-response transactions comprises reordering the intercepted primitive request-response transactions to match an order of the primitive request-response transactions in a sequence of primitive request-response transactions that has at least one corresponding user-level operation.

4. The method according to claim 1, wherein intercepting the sequence of the primitive request-response transactions comprises intercepting a partial sub-sequence of a sequence of primitive request-response transactions that has a corresponding given user-level operation, and wherein reconstructing the one or more scenarios comprises identifying a scenario that best matches the partial sub-sequence.

5. The method according to claim 1, wherein intercepting the sequence of the primitive request-response transactions comprises intercepting a given sequence in which one or more of the primitive request-response transactions comprise nuisance primitive request-response transactions unrelated to the actual user-level operation, wherein the given sequence excluding the nuisance primitive request-response transactions corresponds to the actual user-level operation, and comprising defining one or more parsing rules for handling the nuisance primitive request-response transactions and that are used in deriving the given sequence from the actual user-level operation, and wherein reconstructing the one or more scenarios comprises matching the actual user-level operation to the given sequence using at least a parsing rule defined for handling the nuisance primitive request-response transactions.

6. The method according to claim 1, wherein one or more of the primitive request-response transactions in the intercepted sequence carries payload information, and comprising extracting user-level information by aggregating the payload information from some or all of the primitive request-response transactions in the intercepted sequence, and wherein outputting at least one of the reconstructed one or more scenarios comprises outputting the aggregated payload information.

7. The method according to claim 1, wherein the defined parsing rules include rules which have one or more nuisance tasks in the right-hand-side part, wherein the nuisance tasks are unrelated to a sequence of primitives corresponding to the left-hand-side part.

8. An apparatus, comprising:

an interface, which is configured to communicate over an industrial control network; and a processor, which is configured to:

define multiple parsing rules, describing for each scenario of multiple scenarios, a hierarchy of sub-operations forming the scenario from primitive request-response transactions, each parsing rule comprising a left-hand-side part and one or more right-hand-side parts, and a corresponding score value;

intercept a sequence of the primitive request-response transactions that were exchanged over the industrial control network between a remote node and the controller in response to an actual user-level operation that was performed in the controller by the remote node;

reconstruct from the intercepted sequence of primitive request-response transactions, using the multiple parsing rules, one or more scenarios;

calculate for each of the reconstructed one or more scenarios, a match probability as a function of the corresponding score values of the multiple parsing rules used in the reconstruction of the reconstructed one or more scenarios; and output at least one of the reconstructed one or more scenarios as a reconstruction of the actual user-level operation that generated the intercepted sequence.

9. The apparatus according to claim 8, wherein the processor is configured to select a user-level operation corresponding to one of the reconstructed one or more scenarios having a highest match probability, and to output the selected user-level operation.

10. The apparatus according to claim 8, wherein the processor is configured to intercept the sequence of the primitive request-response transactions by reordering the intercepted primitive request-response transactions to match an order of the primitive request-response transactions in a sequence of primitive request-response transactions that has at least one corresponding user-level operation.

11. The apparatus according to claim 8, wherein the processor is configured to intercept the sequence of the primitive request-response transactions by intercepting a partial sub-sequence of a sequence of primitive request-response transactions that has a corresponding given user-level operation, and to identify a scenario that best matches the partial sub-sequence.

12. The apparatus according to claim 8, wherein the processor is configured to intercept the sequence of the primitive request-response transactions by intercepting a given sequence in which one or more of the primitive request-response transactions comprise nuisance primitive request-response transactions unrelated to the actual user-level operation, wherein the given sequence excluding the nuisance primitive request-response transactions corresponds to the actual user-level operation, to define one or more parsing rules for handling the nuisance primitive request-response transactions and that are used in deriving the given sequence from the given user-level operation, and to reconstruct the one or more scenarios by matching the actual user-level operation to the given sequence using at least a parsing rule defined for handling the nuisance primitive request-response transactions.

13. The apparatus according to claim 8, wherein one or more of the primitive request-response transactions in the intercepted sequence carries payload information, and wherein the processor is configured to extract user-level information by aggregating the payload information from some or all of the primitive request-response transactions in the intercepted sequence and to output the aggregated payload information.

\* \* \* \* \*